(12) United States Patent
Suzuki et al.

(10) Patent No.: US 8,310,753 B2
(45) Date of Patent: Nov. 13, 2012

(54) CONFOCAL SCANNING MICROSCOPE

(75) Inventors: Fumio Suzuki, Yokohama (JP); Naoshi Aikawa, Fujisawa (JP); Kotaro Yamaguchi, Kamakura (JP)

(73) Assignee: Nikon Corporation, Tokyo (JP)

( * ) Notice: Subject to any disclaimer, the term of this patent is extended or adjusted under 35 U.S.C. 154(b) by 165 days.

(21) Appl. No.: 12/632,007

(22) Filed: Dec. 7, 2009

(65) Prior Publication Data
US 2010/0079858 A1     Apr. 1, 2010

Related U.S. Application Data

(63) Continuation of application No. PCT/JP2008/063087, filed on Jul. 15, 2008.

(30) Foreign Application Priority Data

Jul. 19, 2007   (JP) ................................. 2007-187816
Nov. 15, 2007  (JP) ................................. 2007-296678

(51) Int. Cl.
G02B 21/00   (2006.01)
G02B 27/14   (2006.01)

(52) U.S. Cl. ........................................ 359/368; 359/637
(58) Field of Classification Search .......... 359/368–390, 359/434–435, 637, 648
See application file for complete search history.

(56) References Cited

U.S. PATENT DOCUMENTS

| | | | | |
|---|---|---|---|---|
| 2,715,855 | A * | 8/1955 | Altman .......................... | 359/748 |
| 5,260,578 | A | 11/1993 | Bliton et al. | |
| 5,296,700 | A | 3/1994 | Kumagai | |
| 7,233,437 | B2 * | 6/2007 | Hirata et al. .................. | 359/385 |
| 7,324,271 | B2 * | 1/2008 | Winterot et al. .............. | 359/385 |
| 2008/0149867 | A1 * | 6/2008 | Konishi et al. ................ | 250/582 |
| 2010/0172029 | A1 * | 7/2010 | Nakayama .................... | 359/646 |

FOREIGN PATENT DOCUMENTS

| | | |
|---|---|---|
| JP | 05-072481 A | 3/1993 |
| JP | 05-341192 A | 12/1993 |
| JP | 2003-307674 A | 10/2003 |
| JP | 2004-109219 | 4/2004 |

OTHER PUBLICATIONS

Extended European Search Report for European Patent Application No. 08791374.5, May 25, 2012.

* cited by examiner

*Primary Examiner* — Thong Nguyen

(74) *Attorney, Agent, or Firm* — Miles & Stockbridge P.C.

(57) ABSTRACT

A confocal scanning microscope including: an objective system (second objective lens 23 and objective lens 24) illuminating a sample SA with illumination light; a scanning mechanism 31 scanning the sample SA to obtain an intensity signal; and a scanning optical system 32 provided between the scanning mechanism and the objective system. The scanning optical system composed of, in order from the scanning mechanism side, a first positive lens group G1, a second negative lens group G2, and a third positive lens group G3. The third lens group has two chromatic aberration correction portions each formed by a positive lens and a negative lens or negative lens and positive lens. Glass materials are selected such that one performs chromatization and the other performs achromatization, thereby providing a confocal scanning microscope capable of correcting lateral chromatic aberration generated in the objective system in the specific wavelength region by the scanning optical system.

10 Claims, 13 Drawing Sheets

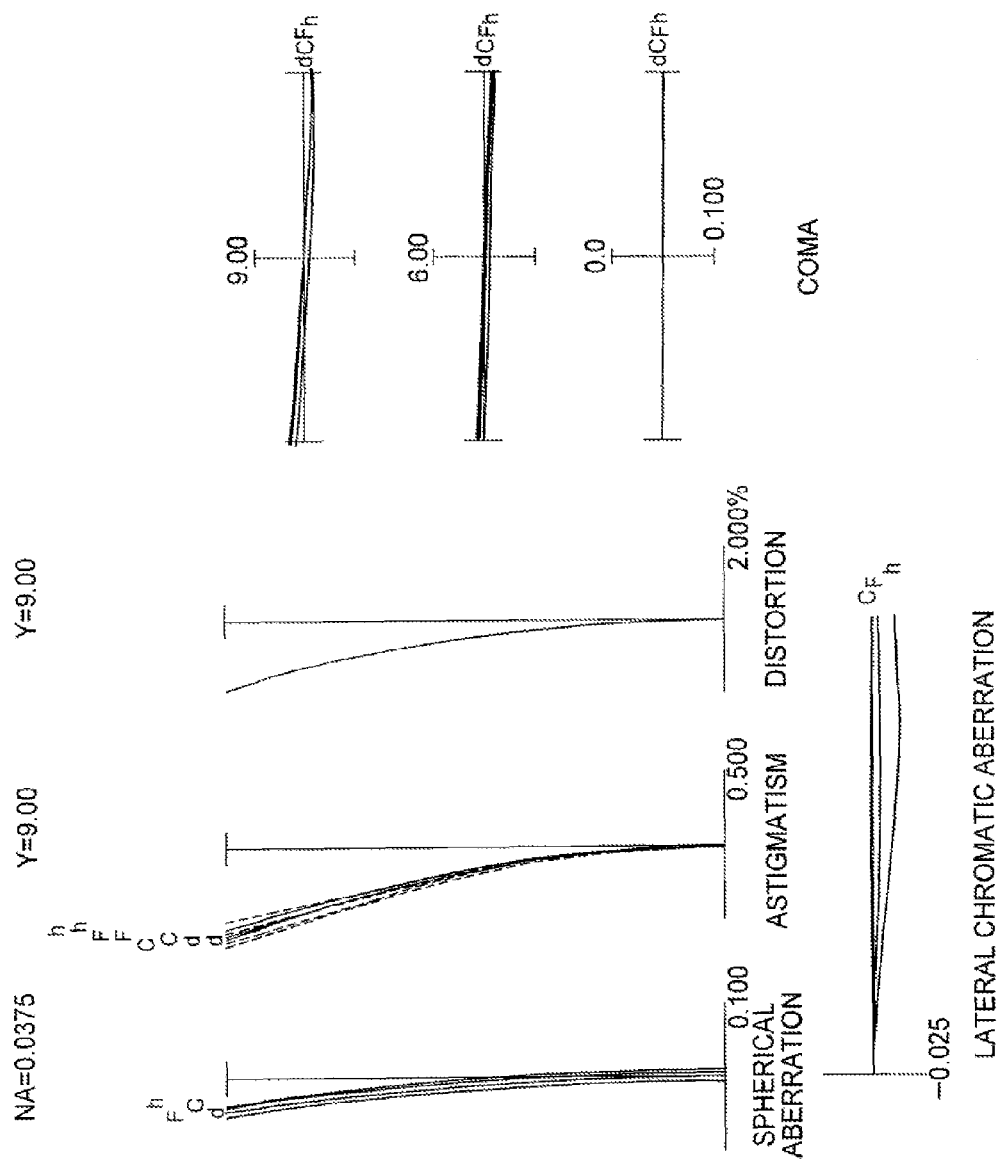

CONFOCAL SCANNING MICROSCOPE

CROSS-REFERENCE TO RELATED APPLICATION

This application is a continuation of International Application No. PCT/JP2008/063087 filed Jul. 15, 2008.

TECHNICAL FIELD

The present invention relates to a confocal scanning microscope.

BACKGROUND ART

A confocal scanning microscope system taking measures to avoid problems caused by lateral chromatic aberration of the objective lens has been known. There have been disclosed, for example, a configuration in which lateral chromatic aberration is reduced by a whole system combining a scanning optical system with an objective lens system such that lateral chromatic aberration of the objective lens system is canceled out by a scanning optical system provided between the objective lens system and a scanning mechanism (see, for example, Japanese Patent Application Laid-Open No. 5-72481), and a configuration in which effects of lateral chromatic aberration generated in different wavelength regions are reduced by providing a plurality of correction optical systems corresponding to respective different wavelength regions (see, for example, Japanese Patent Application Laid-Open No. 5-341192).

In a recent objective lens, lateral chromatic aberration is corrected to an extent that there are practically no problems over relatively large wavelength region, so that only a specific wavelength region (ultraviolet wavelength region) where lateral chromatic aberration is not corrected becomes a problem. The configuration disclosed in Japanese Patent Application Laid-Open No. 5-72481 cannot correct lateral chromatic aberration in this specific wavelength region, and the configuration disclosed in Japanese Patent Application Laid-Open No. 5-341192 becomes complicated since a plurality of correction optical systems have to be used.

DISCLOSURE OF THE INVENTION

The present invention is made in view of the above-described problems, and has an object to provide a confocal scanning microscope capable of correcting lateral chromatic aberration generated at a certain wavelength region of the objective lens system by a scanning optical system.

According to a first aspect of the present invention, there is provided a confocal scanning microscope comprising: an objective optical system (for example, the second objective lens 23 and the objective lens 24 in the embodiment) having a function to illuminate a sample with illumination light; a scanning mechanism that scans a surface of the sample so as to obtain a light intensity signal from the sample; and a scanning optical system that is provided between the scanning mechanism and the objective optical system; the scanning optical system being composed of, in order from the scanning mechanism side, a first lens group having positive refractive power, a second lens group having negative refractive power, and a third lens group having positive refractive power, the third lens group having two chromatic aberration correction portions each formed by a positive lens and a negative lens or a negative lens and a positive lens adjoining each other, and when Vh is defined by the following expression:

$$Vh = 1000 \times \{(nh-nd)/(nd-1)\}$$

where nd denotes a refractive index at d-line, and nh denotes a refractive index at h-line of an optical material constituting a lens, the following conditional expression (1) or (1A) being satisfied:

$$V31 > V32 \text{ and } V33 < V34 \tag{1}$$

or $$V31 < V32 \text{ and } V33 > V34 \tag{1A}$$

where V31 denotes Vh value of the positive lens constituting a chromatic aberration correction portion being disposed to the scanning mechanism side among two chromatic aberration correction portions in the third lens group, V32 denotes Vh value of the negative lens constituting the last mentioned chromatic aberration correction portion, V33 denotes Vh value of the positive lens constituting a chromatic aberration correction portion being disposed to the objective optical system side, and V34 denotes Vh value of the negative lens constituting the last mentioned chromatic aberration correction portion.

In the first aspect of the present invention, it is preferable that the second lens group has a chromatic aberration correction portion that is formed by a positive lens and a negative lens adjoining each other, and the following conditional expression (2) is satisfied:

$$V21 < V22 \tag{2}$$

where V21 denotes a Vh value of the positive lens forming the chromatic aberration correction portion, and V22 denotes a Vh value of the negative lens forming the last mentioned chromatic aberration correction portion.

In the first aspect of the present invention, it is preferable that the following conditional expressions (3) and (4) are satisfied:

$$-1.5 < f/f2 < 0 \tag{3}$$

$$0.8 < f/f3 < 1.8 \tag{4}$$

where f2 denotes a focal length of the second lens group G2, f3 denotes a focal length of the third lens group G3, and f denotes a focal length of the scanning optical system, and
wherein, with respect to V31, V32, V33, V34, V21 and V22, when V31>V32 and V33<V34,
the following conditional expressions (5), (6) and (7) are satisfied:

$$-30 < V21 - V22 < -15 \tag{5}$$

$$+5 < V31 - V32 < +15 \tag{6}$$

$$-30 < V33 - V34 < -10, \tag{7}$$

when V31<V32 and V33>V34,
the following conditional expressions (5), (6A) and (7A) are satisfied:

$$-30 < V21 - V22 < -15 \tag{5}$$

$$-30 < V31 - V32 < -10 \tag{6A}$$

$$+5 < V33 - V34 < +15 \tag{7A}$$

In the first aspect of the present invention, it is preferable that when V31>V32 and V33<V34, the following conditional expression (8) is satisfied:

$$-0.1 < N31 - N32 < +0.1 \quad (8),$$

and when V31<V32 and V33>V34, the following conditional expression (8A) is satisfied:

$$-0.1 < N33 - N34 < +0.1 \quad (8A)$$

where N31 denotes a refractive index at d-line of the positive lens constituting the chromatic aberration correction portion being disposed to the scanning mechanism side among the two chromatic aberration correction portions in the third lens group, N32 denotes a refractive index at d-line of the negative lens constituting the last mentioned chromatic aberration correction portion, N33 denotes a refractive index at d-line of the positive lens constituting the chromatic aberration correction portion being disposed to the objective optical system side, and N34 denotes a refractive index at d-line of the negative lens constituting the last mentioned chromatic aberration correction portion.

In the first aspect of the present invention, it is preferable that the following conditional expression (9) is satisfied:

$$SD/f < 0.85 \quad (9)$$

where SD denotes a distance along an optical axis between the scanning mechanism side surface of the first lens group and the objective optical system side surface of the third lens group, and f denotes a focal length of the scanning optical system.

When the confocal scanning microscope according to the present invention is constructed as described above, lateral chromatic aberration of the objective optical system generated in a specific wavelength region can be corrected by the scanning optical system constituting the confocal scanning microscope.

BRIEF DESCRIPTION OF THE DRAWINGS

FIG. 13 shows various aberrations of the scanning optical system according to Example 6.

EMBODIMENT FOR CARRYING OUT THE INVENTION

Figure 1:
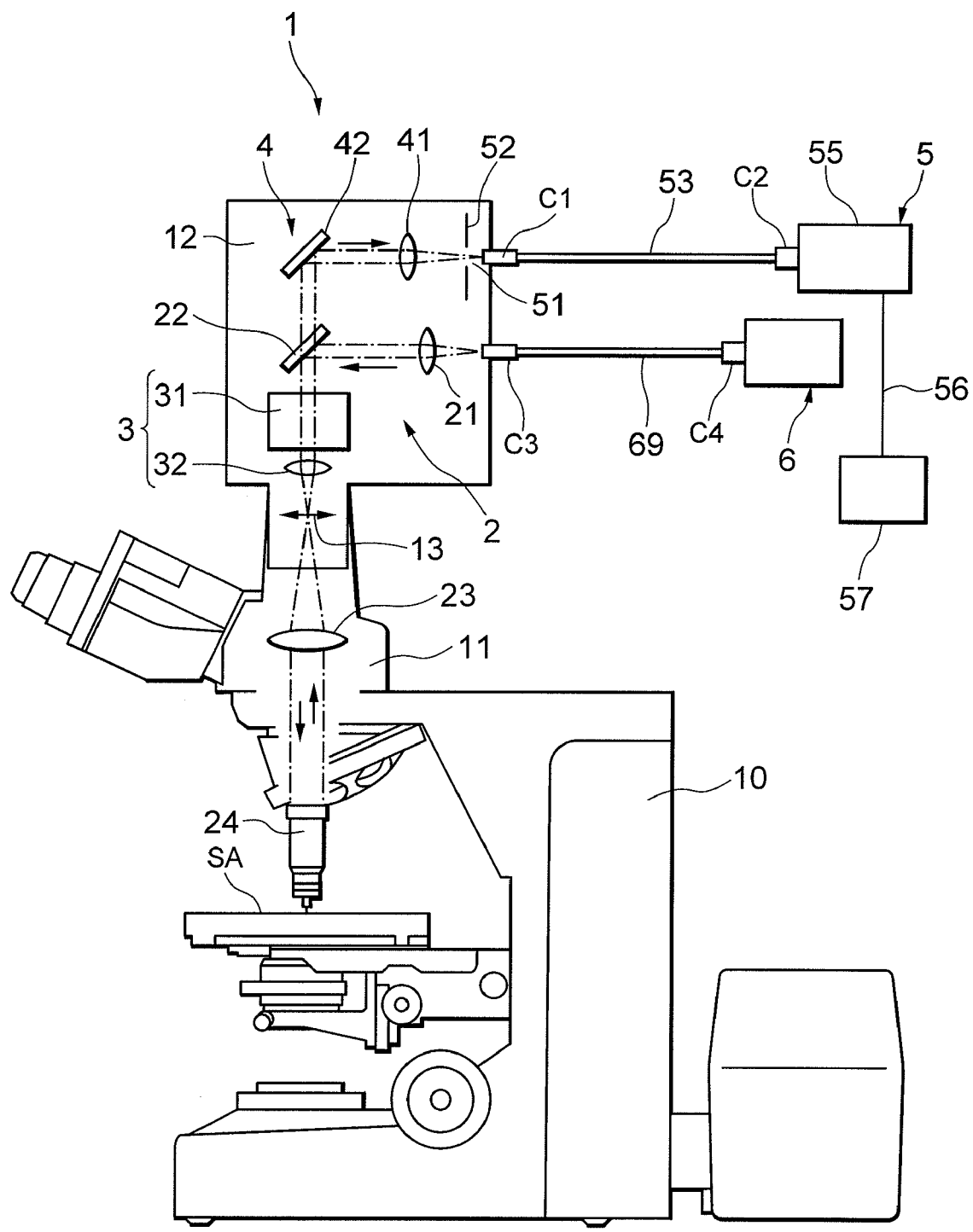
FIG. 1 is a diagram showing a construction of a confocal scanning microscope equipped with a scanning optical system according to the present invention.

An embodiment of the present invention is explained below with reference to accompanying drawings. At first, a construction of a confocal scanning microscope 1 equipped with a scanning optical system according to the present invention is explained with reference to FIG. 1. The confocal scanning microscope 1 is mainly composed of a first converging optical system 2 for converging illumination laser light from a light source unit 6 onto a sample SA, a scanning device 3 that deflects laser light converged on the sample SA to scan on the sample SA, a light detector 5 that detects a light intensity signal from the sample SA, and a second converging optical system 4 that leads light from the sample SA to the light detector 5.

The first converging optical system 2 is composed of a collimator lens 21 that converts laser light (bundle of rays) emanated from the light source unit 6 into parallel light, a dichroic mirror 22 that reflects laser light from the collimator lens 21 toward the sample SA, and a second objective lens 23 and an objective lens 24 that converge laser light reflected by the dichroic mirror 22 onto the sample SA.

The second objective lens 23 is provided in a body tube portion 11 of a microscope body 10, and the collimator lens 21 and the dichroic mirror 22 are provided in a microscope case 12 provided upper portion of the body tube 11. The light source unit 6 and the microscope case 12 are connected by an optical fiber 69 using connector portions C3 and C4.

The scanning device 3 is composed of a scanning mechanism 31 having a galvanometer mirror (not shown) and a scanning optical system 32, and provided between the dichroic mirror 22 and the second objective lens 23 in the microscope case 12. The second converging optical system 4 is composed of the objective lens 24, the second objective lens 23, a total reflection mirror 42 for reflecting fluorescence from the sample SA, and a first converging lens 41 that converges fluorescence reflected by the total reflection mirror 42 onto a light blocking plate 52 having a pinhole 51 in the light detector 5. The total reflection mirror 42 and the first converging lens 41 are disposed upward of the dichroic mirror 22 and the collimator lens 21 in the microscope case 12.

The light detector 5 is composed of the light blocking plate 52 having the pinhole 51, an optical fiber 53 on which the light (fluorescence) passed through the pinhole 51 is incident, and a light detection unit 55 that detects light (fluorescence) passed through the pinhole 51 and the optical fiber 53. The light blocking plate 52 is disposed in the microscope case 12, and the optical fiber 53 is connected to the microscope case 12 and the light detection unit by means of the respective connectors C1 and C2. A processing unit 57 is electrically connected to the light detection unit 55 through a cable 56, and on the basis of detected signal detected by the light detection unit 55, the image of the sample SA is processed by the processing unit 57, and the observation image of the sample SA obtained by the processing unit 57 is displayed on an unillustrated monitor. Incidentally, illumination light emanated from the scanning device 3 is temporally converged on an image plane 13 and converged again by the second objective lens 23 and the objective lens 24 on the sample SA, so that the scanning surface of the sample, the image plane 13 and the pinhole 51 are conjugate relation with each other.

In order to correct lateral chromatic aberration generated at the specific wavelength region (ultraviolet wavelength region) in the objective lens 24, the scanning optical system 32 generates lateral chromatic aberration in ultraviolet wavelength region to that extent of about the same amount of lateral chromatic aberration as that generated by the objective optical system composed of the objective lens 24 and the second objective lens 23. In a recent objective lens, in particular, in an apochromat objective optical system, lateral chromatic aberration is excellently corrected over entire visible wavelength region. However, in fluorescence observation, as wavelength region of excitation light becomes shorter wavelength region (ultraviolet wavelength region), it becomes difficult to correct lateral chromatic aberration from ultraviolet wavelength region to entire visible wavelength region. The trend is conspicuous in a portion of an oil-immersion type high-NA objective optical system. Accordingly, in the scanning optical system 32 according to the present embodiment, lateral chromatic aberration is corrected in ordinary manner in the visible wavelength region where lateral chromatic aberration of the objective optical system does not become an issue, and corrected together with the objective optical system in the ultraviolet wavelength region where lateral chromatic aberration becomes an issue.

Then, a characteristic of the above-mentioned scanning optical system 32 is explained with reference to FIG. 2. Incidentally, FIG. 2 corresponds to Example 1 described later. The scanning optical system 32 according to the present embodiment is composed of, in order from the scanning mechanism 31 side, a first lens group G1 having positive refractive power, a second lens group G2 having negative refractive power, and a third lens group G3 having positive refractive power. The first lens group G1 is composed of a single positive lens L111, the second lens group is composed of a positive lens L121 and a negative lens L122, and the third lens group G3 is composed of a positive lens L131, a negative lens L132, and a positive lens L133. Here, the second lens group G2 has a glass combination to perform achromatization to peripheral rays, and the third lens group G3 has a glass combination having two chromatic aberration correction portions to perform chromatization and achromatization, so that with combining the second lens group G2 and the third lens group G3, lateral chromatic aberration in the visible wavelength region and longitudinal chromatic aberration in the using wavelength region are corrected, and in the ultraviolet wavelength region, a given amount of lateral chromatic aberration remains. In the scanning optical system 32, a plane PL (hereinafter called a pupil conjugate plane) conjugate with a pupil of the objective lens is disposed in the scanning mechanism 31, and the image plane IM corresponds to the image plane 13 in FIG. 1.

Then, conditions for constructing such a scanning optical system 32 are explained. On the basis of Vh value defined by refractive indices nd at d-line and nh at h-line of an optical material constituting a lens, when Vh value of the positive lens (for example, double convex positive lens L131 in FIG. 2) that is disposed to the scanning mechanism 31 side (the pupil conjugate plane PL side) of the chromatic aberration correction portion among the two chromatic aberration correction portions constituting the third lens group G3 is denoted by V31, similarly Vh value of the negative lens (for example, double concave negative lens L132 in FIG. 2) is denoted by V32, Vh value of the positive lens (for example, double convex positive lens L133 in FIG. 2) constituting the chromatic aberration correction portion disposed to the objective optical system side (image plane IM side) is denoted by V33, and similarly Vh value of the negative lens (for example, double concave negative lens L132 in FIG. 2) is denoted by V34 (=V32), the scanning optical system 32 is constructed by satisfying the following conditional expression (1) or (1A):

$$V31>V32 \text{ and } V33<V34 \quad (1)$$

$$V31<V32 \text{ and } V33>V34 \quad (1A)$$

where Vh=1000×(nh−nd)/(nd−1).

Figure 2:
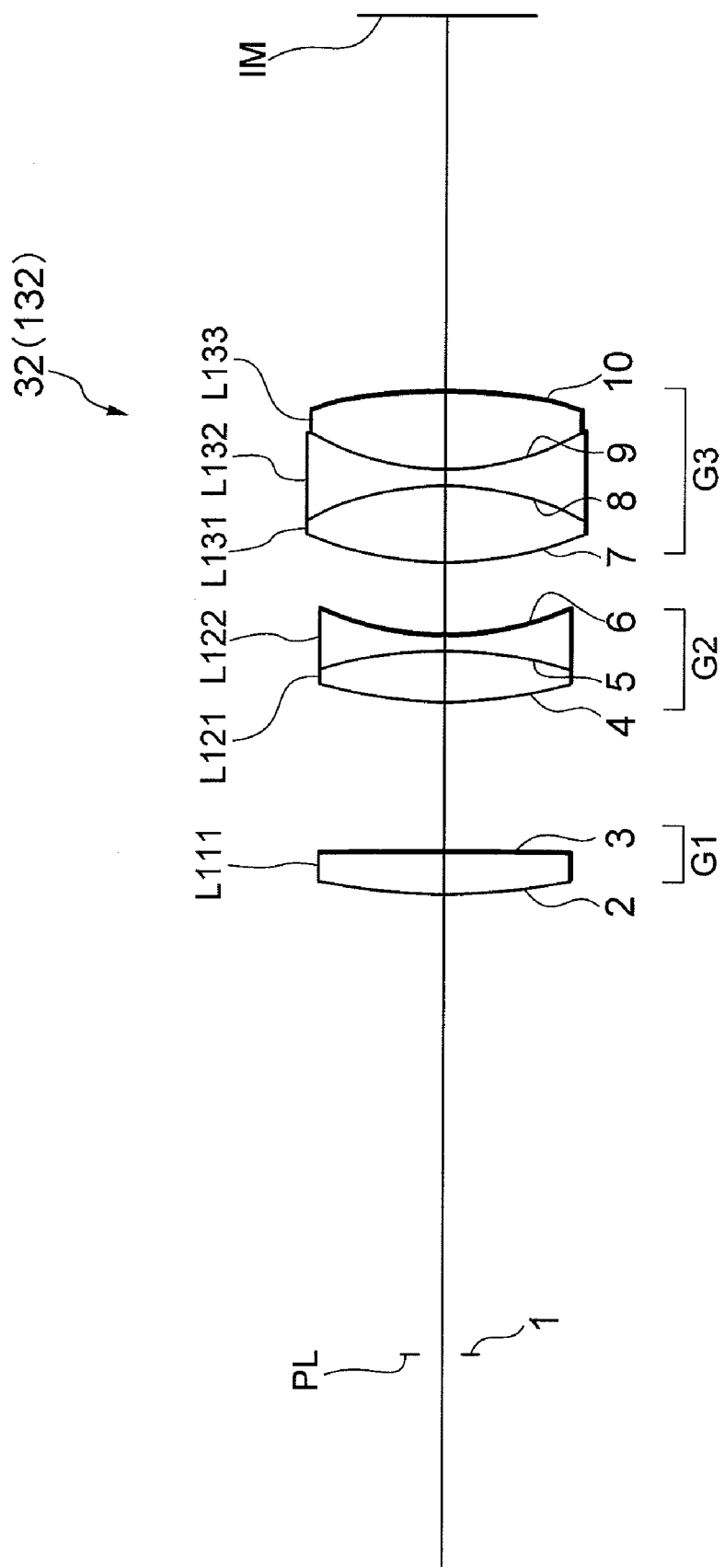
FIG. 2 is a diagram showing a lens configuration of a scanning optical system according to Example 1.

Incidentally, Example shown in FIG. 2 satisfies conditional expression (1).

Conditional expression (1) is for effectively adjusting lateral chromatic aberration upon disposing two chromatic aberration correction portions in the third lens group G3 (the lens configuration shown in FIG. 2 forms two chromatic aberration correction portions by the achromatic lens composed of three lenses). With satisfying conditional expression (1) or (1A), in the case shown in FIG. 2, in order from the objective optical system side, achromatization is carried out by the boundary (the ninth surface in FIG. 2) between the positive lens L133 and the negative lens L132, and chromatization is carried out by the boundary (the eighth surface in FIG. 2) between the negative lens L132 and the positive lens L131. With this lens configuration, only lateral chromatic aberration in the specific wavelength in the ultraviolet wavelength region is adjusted, and lateral chromatic aberration in the other wavelength regions can be corrected. Moreover, when glass materials are selected by satisfying conditional expression (1A), chromatization is carried out by the boundary between the positive lens L133 and the negative lens L132, and achromatization is carried out by the boundary between the negative lens L132 and the positive lens L131, so that the similar effect can be obtained.

Similarly, the following conditional expression (2) is preferably satisfied:

$$V21<V22 \quad (2)$$

where V21 denotes a dispersion ratio Vh of the positive lens L121 constituting the second lens group G2, and V22 denotes a dispersion ratio Vh of the negative lens L122 constituting the second lens group G2.

Conditional expression (2) is a condition to constitute the second lens group G2 as an achromatic lens. With satisfying conditional expression (2), it becomes possible to carry out achromatization by the boundary (the fifth surface in FIG. 2) between the positive lens L121 and the negative lens L122. Together with the configuration of the third lens group G3 defined by conditional expression (1) or (1A), further effective adjustment of lateral chromatic aberration can be realized.

In the scanning optical system 32, when values of Vh are V31>V32 and V33<V34, the following conditional expressions (3) through (7) are preferably satisfied, and when values of Vh are V31<V32 and V33>V34, the following conditional expressions (3) through (5), (6A) and (7A) are preferably satisfied:

$$-1.5<f/f2<0 \quad (3)$$

$$0.8<f/f3<1.8 \quad (4)$$

$$-30<V21-V22<-15 \quad (5)$$

$$+5<V31-V32<+15 \quad (6)$$

$$-30<V33-V34<-10 \quad (7)$$

$$-1.5<f/f2<0 \quad (3)$$

$$0.8<f/f3<1.8 \quad (4)$$

$$-30 < V21-V22 < -15 \quad (5)$$

$$-30 < V31-V32 < -10 \quad (6A)$$

$$+5 < V33-V34 < +15 \quad (7A)$$

where f denotes a focal length of the scanning optical system, f2 denotes a focal length of the second lens group G2, and f3 denotes a focal length of the third lens group G3.

Conditional expressions (3) through (7) or (3) through (5), (6A) and (7A) are conditions that, in the scanning optical system 32, lateral chromatic aberration in the visible wavelength region and longitudinal chromatic aberration in the using wavelength region are corrected, and a given amount of lateral chromatic aberration in the ultraviolet wavelength region is remained. In Example shown in FIG. 2, conditional expressions (3) through (7) are satisfied.

The value of conditional expression (3) shows contribution of refractive power of the second lens group G2 to the whole system, and obtains an effect to carry out achromatization of the second lens group G2 together with the following conditional expression (5). When refractive power of the second lens group G2 is within the scope of conditional expression (3), the value of conditional expression (5) becomes effective.

The value of conditional expression (4) shows contribution of refractive power of the third lens group G3 to the whole system, and obtains an effect to carry out achromatization of the third lens group G3 together with the values of the following conditional expressions (6) or (6A), and (7) or (7A). When refractive power of the third lens group G3 is within the scope of conditional expression (4), values of conditional expressions (6) or (6A), and (7) or (7A) become effective.

The value of conditional expression (5) becomes negative, so that the boundary (the fifth surface) between the positive lens L121 and the negative lens L122 of the second lens group G2 has an effect to carry out achromatization. When the value is equal to or falls below the lower limit of conditional expression (5), achromatization effect of lateral chromatic aberration in the second lens group G2 becomes excessive, and the given amount of lateral chromatic aberration in the ultraviolet wavelength region by means of chromatization effect of the third lens group G3 becomes difficult to obtain, so that it is undesirable. On the other hand, when the value is equal to or exceeds the upper limit of conditional expression (5), achromatization effect of lateral chromatic aberration by the second lens group G2 becomes insufficient. As a result, lateral chromatic aberration in the visible wavelength region becomes difficult to be excellently corrected, so that it is undesirable.

The value of conditional expression (6) becomes positive, so that the boundary, (the eighth surface) between the positive lens L131 and the negative lens L132, which composes chromatic aberration correction portion locating to the scanning mechanism 31 side of the third lens group G3 has an effect to carry out chromatization. When the value is equal to or falls below the lower limit of conditional expression (6), chromatization effect of lateral chromatic aberration at the boundary between the positive lens L131 and the negative lens L132 becomes insufficient. As a result, it becomes difficult to obtain a given amount of lateral chromatic aberration in the ultraviolet wavelength region, so that it is undesirable. On the other hand, when the value is equal to or exceeds the upper limit of conditional expression (6), chromatization effect of lateral chromatic aberration at the boundary between the positive lens L131 and the negative lens L132 becomes excessive. As a result, it becomes difficult to excellently correct lateral chromatic aberration in the visible wavelength region, so that it is undesirable.

The value of conditional expression (7) becomes negative, so that the boundary, (the ninth surface) between the negative lens L132 and the positive lens L133, which forms a chromatic aberration correction portion locating to the objective optical system side of the third lens group G3 has an effect to carry out achromatization. When the value is equal to or falls below the lower limit of conditional expression (7), achromatization effect of lateral chromatic aberration at the boundary between the negative lens L132 and the positive lens L133 becomes excessive. As a result, it becomes difficult to obtain the given amount of lateral chromatic aberration in the ultraviolet wavelength region by means of chromatization effect of lateral chromatic aberration at the boundary between the positive lens L131 and the negative lens L132, so that it is undesirable. On the other hand, the value is equal to or exceeds the upper limit of conditional expression (7), achromatization effect of lateral chromatic aberration at the boundary between the negative lens L132 and the positive lens L133 becomes insufficient. As a result, it becomes difficult to excellently correct lateral chromatic aberration in the visible wavelength region, so that it is undesirable. Moreover, when the value cannot satisfy conditional expression (7), not only lateral chromatic aberration, but also longitudinal chromatic aberration in the using wavelength region difficult to be corrected, so that it is undesirable.

In the case of conditional expressions (6A) and (7A), contrary to the above-described case, the boundary, between the positive lens L131 and the negative lens L132, which forms chromatic aberration correction portion locating to the scanning mechanism 31 side has an effect of achromatization, and the boundary, between the negative lens L132 and the positive lens L133, which forms chromatic aberration correction portion locating to the objective optical system side has an effect of chromatization. When the value departs from the scope of the conditional expression, the phenomenon is the same as described above.

Figure 4:
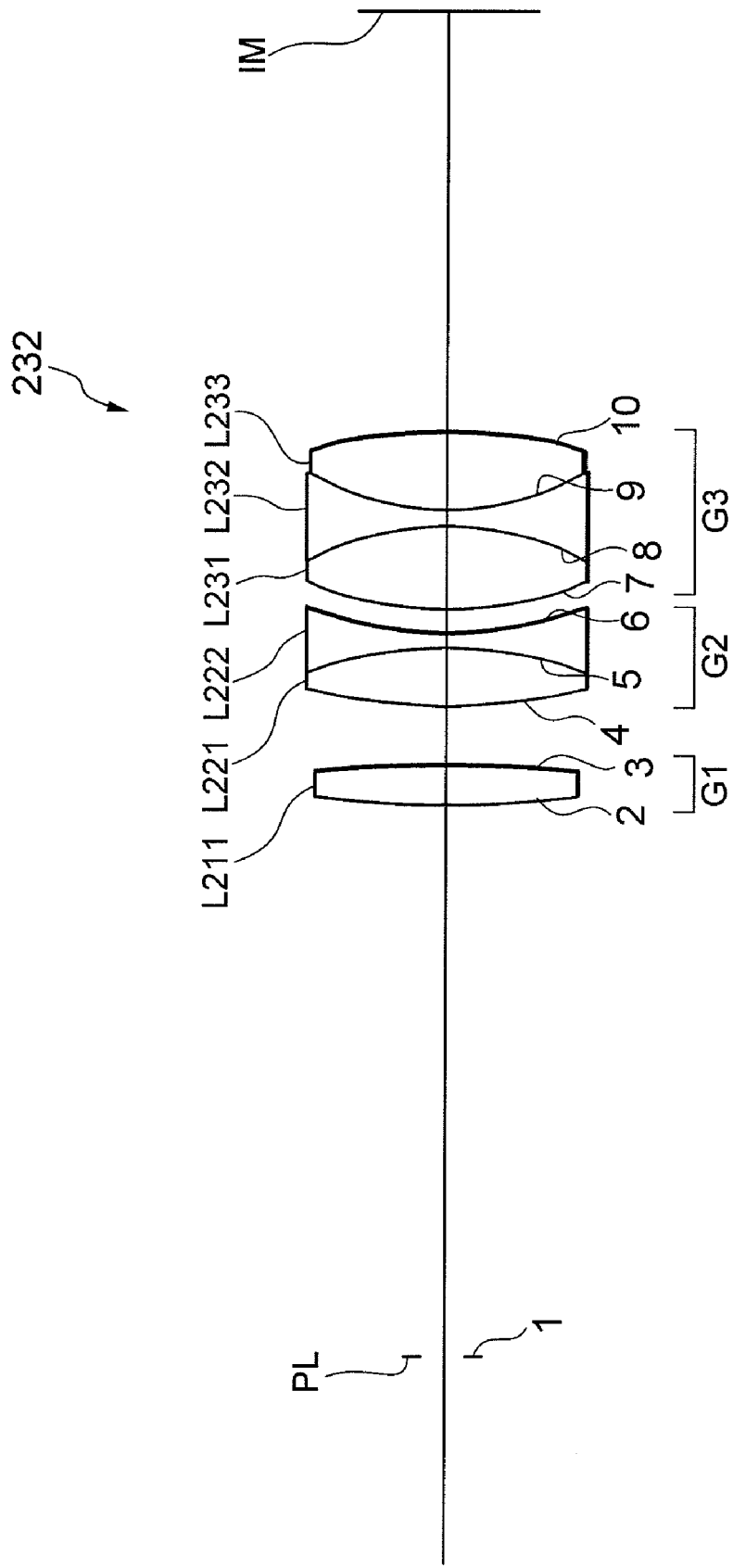
FIG. 4 is a diagram showing a lens configuration of a scanning optical system according to Example 2.

Moreover, the scanning optical system 32 according to the present embodiment preferably satisfies the following conditional expression (8) when V31>V32 and V33<V34, or conditional expression (8A) when V31<V32 and V33>V34:

$$-0.1 < N31-N32 < +0.1 \quad (8)$$

$$-0.1 < N33-N34 < +0.1 \quad (8A)$$

where N31 denotes a refractive index at d-line of the positive lens L131 constituting chromatic aberration correction portion of the scanning mechanism 31 side among two chromatic aberration correction portions of the third lens group G3, N32 similarly denotes a refractive index at d-line of the negative lens L132, N33 denotes a refractive index at d-line of the positive lens L133 constituting chromatic aberration correction portion of the objective optical system side among two chromatic aberration correction portions of the third lens group, and N34 (=N32) similarly denotes a refractive index at d-line of the negative lens L132. In FIGS. 2 and 4, each of N32 and N34 is a refractive index at d-line of the negative lens L132, and Example shown in FIG. 2 satisfies conditional expression (8).

Conditional expressions (8) and (8A) are conditions that, in the scanning optical system 32, lateral chromatic aberration in the visible wavelength region and longitudinal chromatic aberration in the using wavelength region are corrected, and in the ultraviolet wavelength region a given amount of lateral chromatic aberration is remained and the rest of various aberrations are excellently corrected. When the value departs from the scope of conditional expression (8) or (8A), refractive power of the boundary (the eighth surface) between the positive lens L131 and the negative lens L132 or the boundary (the ninth surface) between the negative lens L132 and the positive lens L133 becomes strong. As a result, because of chromatization effect of lateral chromatic aberration, it becomes difficult to correct lateral chromatic aberration in the visible wavelength region and to remain a given amount of lateral chromatic aberration in the ultraviolet wavelength region without affecting to correction of various aberrations, so that it is undesirable.

In the scanning optical system 32 according to the present embodiment, the following conditional expression (9) is preferably satisfied:

$$SD/f < 0.85 \qquad (9)$$

where SD denotes a distance between the scanning mechanism 31 side (pupil conjugate surface PL side) surface (the second surface in FIG. 2) of the first lens group G1 and the object side (objective optical system or the image plane IM side) surface (the tenth surface in FIG. 2) of the third lens group G3, and f denotes a focal length of the scanning optical system 32.

Upon using the scanning optical system 32 in a confocal scanning microscope 1, conditional expression (9) is for preventing the scanning optical system 32 from affecting to the other components of the confocal scanning microscope 1. When the value departs from the scope of conditional expression (9), the scanning optical system 32 becomes large, so that configuration of the scanning mechanism (such as a galvanometer mirror) 31 disposed to the pupil conjugate plane PL side is restricted. The scanning mechanism (such as a galvanometer mirror) 31 is tried to be disposed without satisfying conditional expression (9), configuration of the scanning optical system 32 cannot be achieved by the above-described positive-negative-positive three-lens configuration. In this case, the lens configuration becomes a telephoto type, in which negative refractive power comes to the image plane side, so that it becomes difficult to excellently correct lateral chromatic aberration in the visible wavelength region with remaining a given amount of lateral chromatic aberration in the ultraviolet wavelength region. Accordingly, it is undesirable.

Then, specific examples (scanning optical systems 132 through 632) of the scanning optical system 32 as described above are explained below.

Example 1

FIG. 2 is a diagram showing a lens configuration of a scanning optical system 132 according to Example 1 that is used in a confocal scanning microscope 1. The scanning optical system 132 according to the Example 1 is composed of, in order from a pupil conjugate plane PL side, a first lens group G1 composed of a double convex positive lens L111, a second lens group G2 composed of a cemented lens having negative refractive power constructed by a double convex positive lens L121 cemented with a double concave negative lens L122, and a third lens group G3 having positive refractive power composed of a cemented lens constructed by a double convex positive lens L131 cemented with a double concave negative lens L132 cemented with a double convex positive lens L133. In Example 1, the third lens group G3 is composed of a cemented lens constructed by three lenses of a positive-negative-positive configuration, and the negative lens (double concave negative lens L132) locating at the center is commonly used in two chromatic aberration correction portions. The above-described scanning mechanism (such as a galvanometer mirror) 31 is disposed in the vicinity of the pupil conjugate plane PL.

Various values associated with the scanning optical system according to Example 1 are listed in Table 1. In Table 1, f denotes a focal length of the scanning optical system 132, i denotes a surface number counted in order from the pupil conjugate plane PL side, r denotes a radius of curvature of the lens surface, d denotes a distance between lens surfaces, N(d) denotes a refractive index at d-line (587.6 nm), N(h) denotes refractive index at h-line (404.7 nm), ν denotes an Abbe number. "r=0.0000" denotes a plane surface. The explanation of reference symbols is the same in the other Examples.

TABLE 1 f = 60

| i | r | d | ν | N (d) | N (h) | |
|---|---|---|---|---|---|---|
|   |   | 0.0000 |   | 1.000000 |   |   |
| 1 | 0.0000 | 44.0500 |   | 1.000000 |   | PL |
| 2 | 63.0470 | 4.0000 | 71.31 | 1.569070 | 1.582580 | L11 |
| 3 | −269.9760 | 14.5000 |   | 1.000000 |   |   |
| 4 | 45.1530 | 5.0000 | 82.56 | 1.497820 | 1.507940 | L21 |
| 5 | −37.0010 | 1.5000 | 39.68 | 1.654115 | 1.683310 |   |
| 6 | 32.0110 | 7.0000 |   | 1.000000 |   |   |
| 7 | 36.0120 | 7.5000 | 35.30 | 1.592700 | 1.623340 | L31 |
| 8 | −27.0080 | 1.5000 | 44.27 | 1.613397 | 1.637555 |   |
| 9 | 27.0080 | 7.5000 | 82.56 | 1.497820 | 1.507940 | L33 |
| 10 | −47.8020 | 35.4085 |   | 1.000000 |   |   |

| (Values for Conditional Expressions) |
|---|
| (1): V31 = 51.7, V32 (=V34) = 39.4, V33 = 20.3 |
| (2): V21 = 20.3, V22 = 44.6 |
| (3): f/f2 = −0.76 |
| (4): f/f3 = 1.24 |
| (5): V21 − V22 = −24.3 |
| (6): V31 − V32 = 12.3 |
| (7): V33 − V32 = −19.1 |
| (8): N31 − N32 = −0.02 |
| (9): SD/f = 0.81 |

As described above, Example 1 satisfies all conditional expressions (1) through (9).

Figure 3:
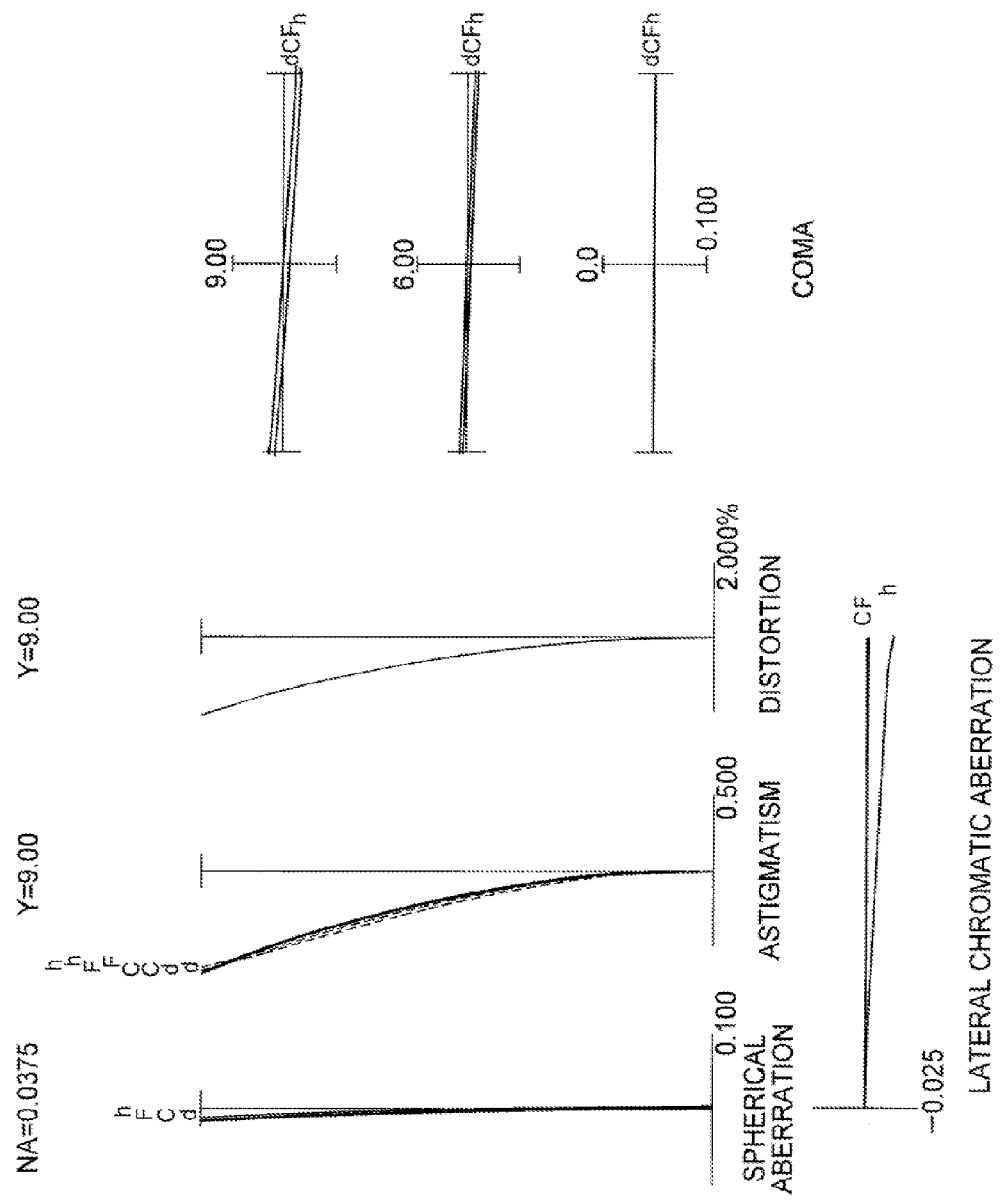
FIG. 3 shows various aberrations of the scanning optical system according to Example 1.

FIG. 3 shows various aberrations of the scanning optical system according to Example 1. In respective graphs, NA denotes a numerical aperture in the image plane side, Y denotes an image height, d denotes an aberration curve at d-line (wavelength λ=587.6 nm), and h denotes an aberration curve at h-line (wavelength λ=404.7 nm), C denotes an aberration curve at C-line (wavelength λ=656.3 nm), and F denotes an aberration curve at F-line (wavelength λ=486.1 nm). The above-described explanation regarding various aberration graphs is the same as the other Examples. As is apparent from FIG. 3, lateral chromatic aberration in h-line becomes a given amount and the other aberrations are excellently corrected.

Example 2

FIG. 4 is a diagram showing a lens configuration of a scanning optical system 232 according to Example 2 that is used in a confocal scanning microscope 1. The scanning optical system 232 according to Example 2 is composed of, in order from the pupil conjugate plane PL side, a first lens group G1 composed of a double convex positive lens L211, a second lens group G2 having negative refractive power composed of a cemented lens constructed by a double convex positive lens L221 cemented with a double concave negative lens L222, and a third lens group G3 having positive refractive power composed of a cemented lens constructed by a double convex positive lens L231 cemented with a double concave negative lens L232 cemented with a double convex positive lens L233. In this Example 2 also, the third lens group G3 is composed of a cemented lens constructed by three lenses of a positive-negative-positive configuration, and the negative lens (double concave negative lens L232) locating at the center is commonly used in two chromatic aberration correction portions. The above-described scanning mechanism (such as a galvanometer mirror) 31 is disposed in the vicinity of the pupil conjugate plane PL.

Figure 5:
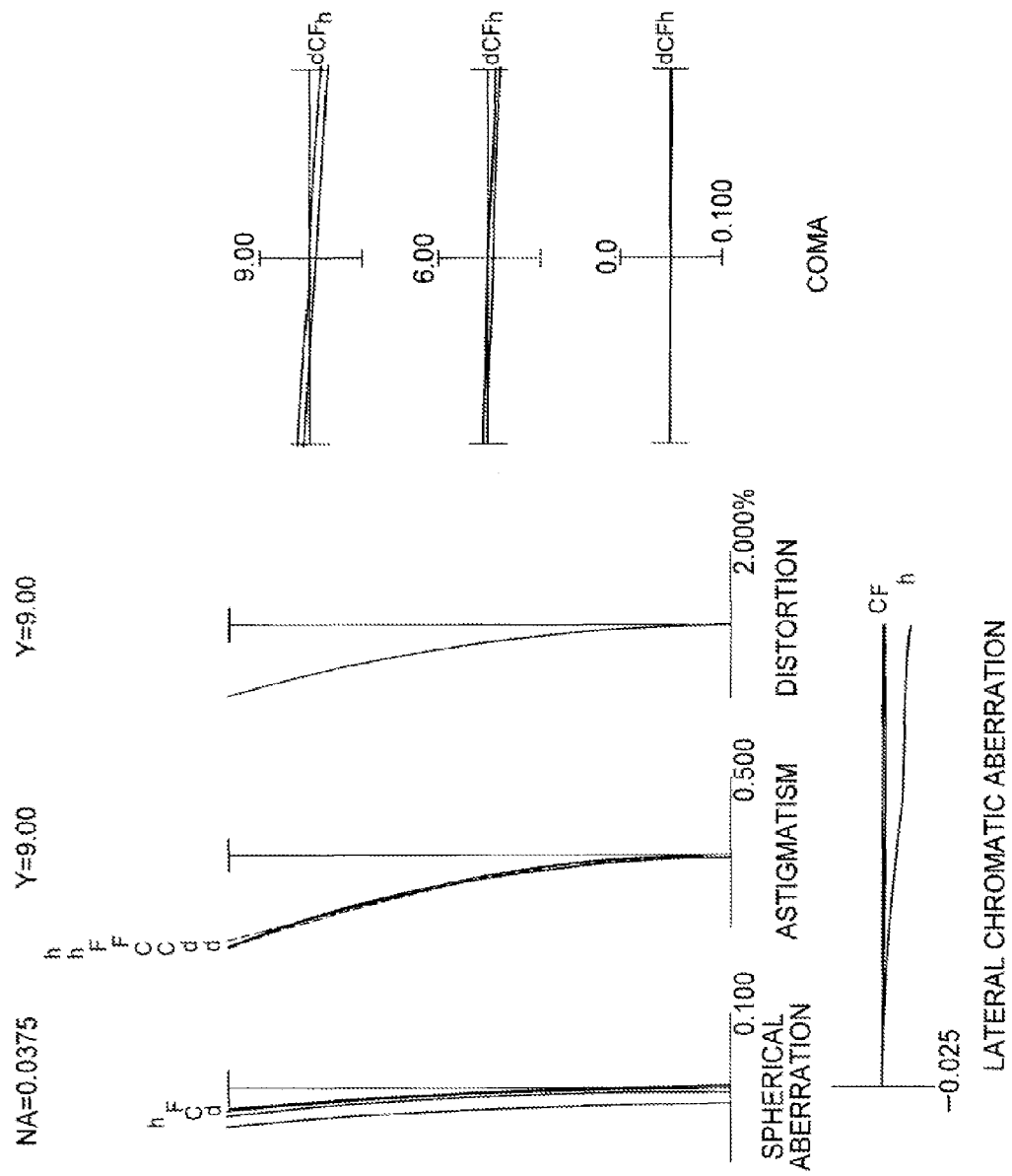
FIG. 5 shows various aberrations of the scanning optical system according to Example 2.

Various values associated with the scanning optical system according to Example 2 are listed in Table 2. Various aberration curves of the scanning optical system 232 according to Example 2 are shown in FIG. 5.

TABLE 2 f = 60

| i | r | d | ν | N (d) | N (h) | |
|---|---|---|---|---|---|---|
|  | 0.0000 |  | 1.000000 |  |  |  |
| 1 | 0.0000 | 59.9500 |  | 1.000000 |  | PL |
| 2 | 116.6840 | 4.0000 | 71.31 | 1.569070 | 1.582580 | L211 |
| 3 | −116.6840 | 6.0000 |  | 1.000000 |  |  |
| 4 | 58.9500 | 6.0000 | 82.56 | 1.497820 | 1.507940 | L221 |
| 5 | −40.4150 | 1.5000 | 39.68 | 1.654115 | 1.683310 | L222 |
| 6 | 40.4150 | 2.4000 |  | 1.000000 |  |  |
| 7 | 36.6300 | 8.5000 | 35.30 | 1.592700 | 1.623340 | L231 |
| 8 | −27.1000 | 1.5000 | 44.27 | 1.613397 | 1.637555 | L232 |
| 9 | 27.1000 | 8.0000 | 82.56 | 1.497820 | 1.507940 | L233 |
| 10 | −55.5300 | 42.0667 |  | 1.000000 |  |  |

(Values for Conditional Expressions)

(1): V31 = 51.7, V32 (=V34) = 39.4, V33 = 20.3
(2): V21 = 20.3, V22 = 44.6
(3): f/f2 = −0.65
(4): f/f3 = 1.15
(5): V21 − V22 = −24.3
(6): V31 − V32 = 12.3
(7): V33 − V32 = −19.1
(8): N31 − N32 = −0.02
(9): SD/f = 0.63

As described above, Example 2 satisfies all conditional expressions (1) through (9). Lateral chromatic aberration in h-line becomes a given amount and the other aberrations are excellently corrected.

Example 3

Figure 6:
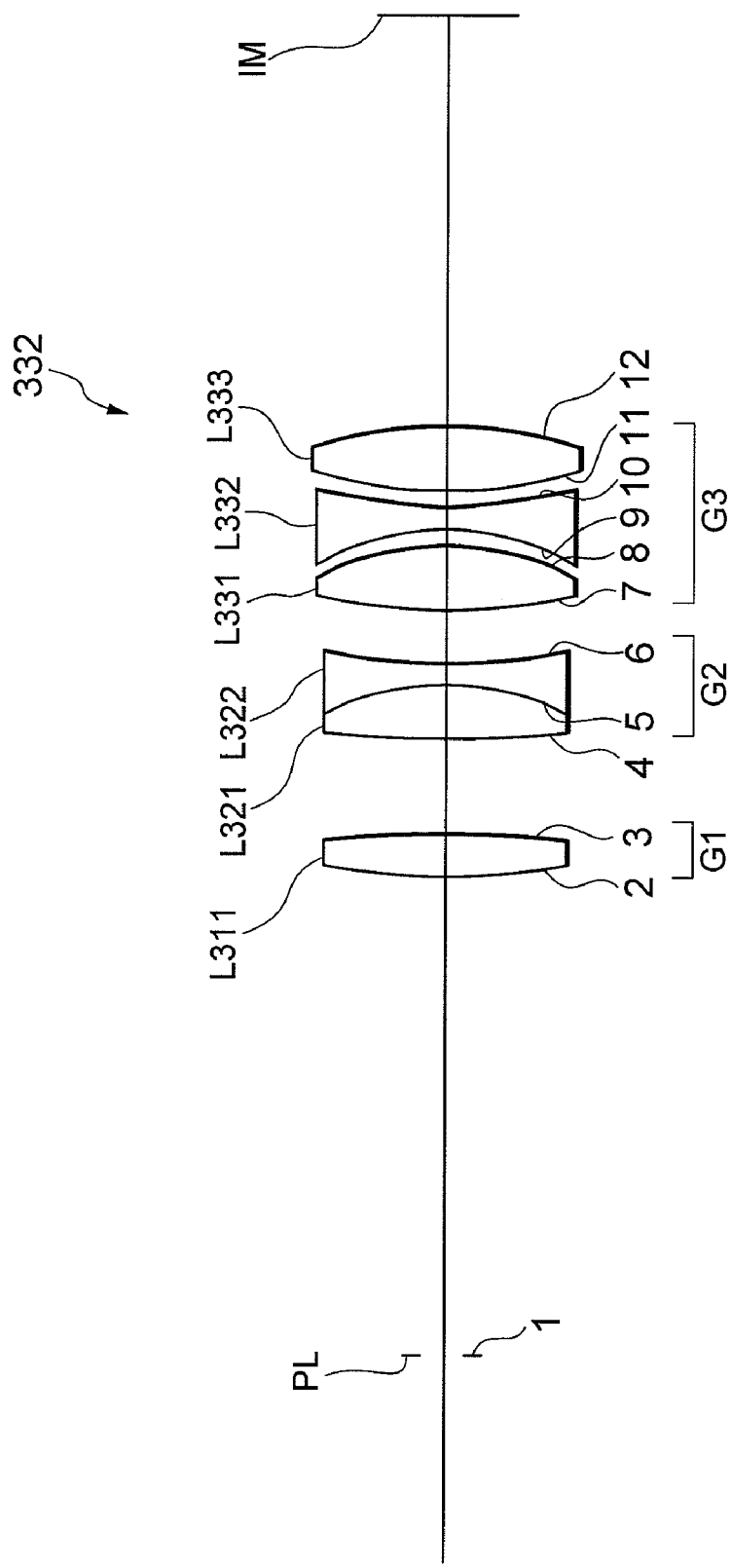
FIG. 6 is a diagram showing a lens configuration of a scanning optical system according to Example 3.

FIG. 6 is a diagram showing a lens configuration of a scanning optical system 332 according to Example 3 that is used in a confocal scanning microscope 1. The scanning optical system 332 according to Example 3 is composed of, in order from the pupil conjugate plane PL side, a first lens group G1 composed of a double convex positive lens L311, a second lens group G2 having negative refractive power composed of a cemented lens constructed by a double convex positive lens L321 cemented with a double concave negative lens L322, and a third lens group G3 having positive refractive power composed of a double convex positive lens L331, a double concave negative lens L332 and a double convex positive lens L333 each having a given air space in between. In Examples 1 and 2, the third lens group G3 is constructed by a cemented lens composed of three lenses. However in Example 3, each of three lenses with positive, negative and positive refractive power is disposed with a given air space in between, and the negative lens (a double concave negative lens L332) located at the center is commonly used at two chromatic aberration correction portions. The above-described scanning mecha-nism (such as a galvanometer mirror) 31 is disposed in the vicinity of the pupil conjugate plane PL.

Figure 7:
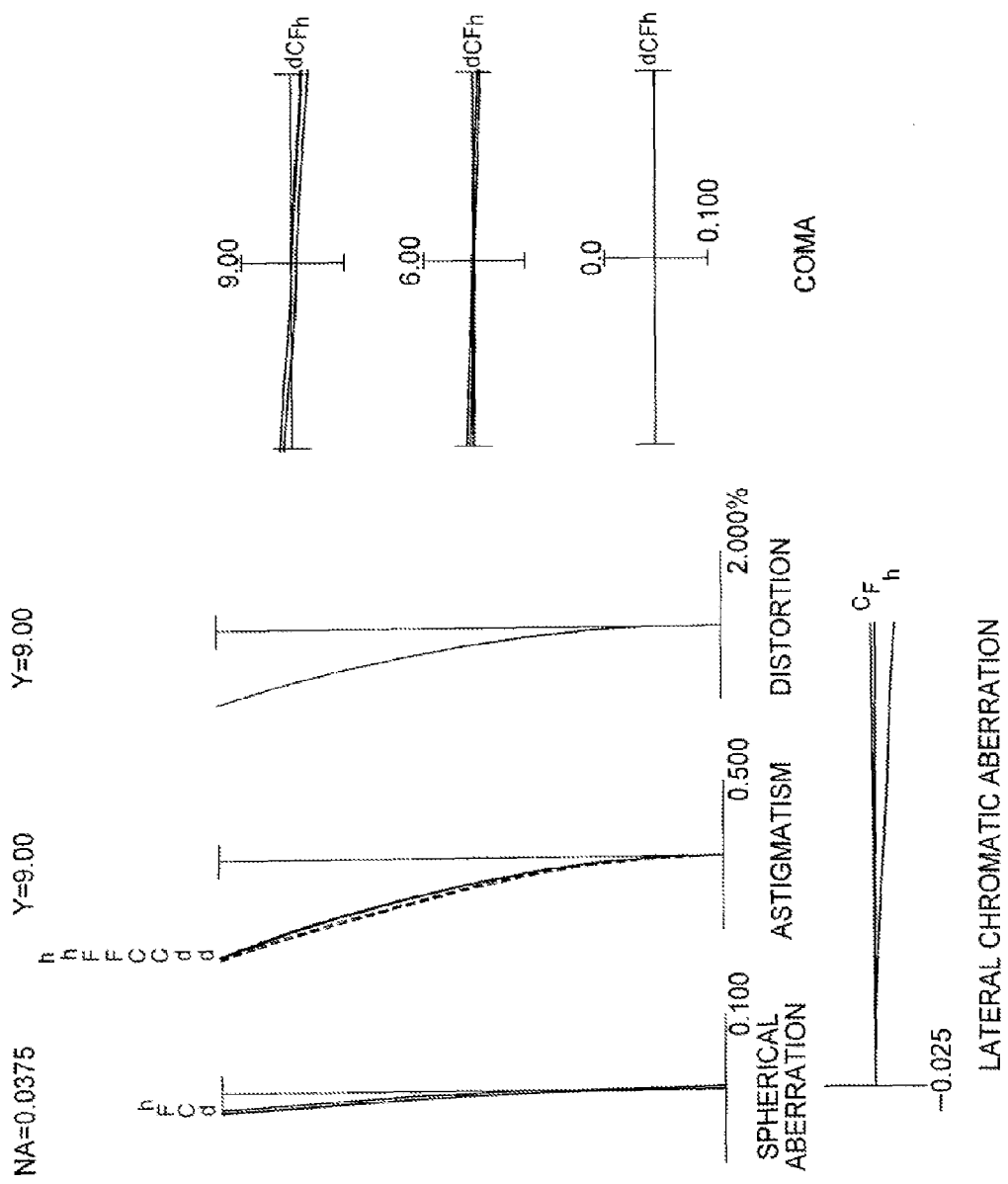
FIG. 7 shows various aberrations of the scanning optical system according to Example 3.

Various values associated with the scanning optical system according to Example 3 are listed in Table 3. Various aberration curves of the scanning optical system 332 according to Example 3 are shown in FIG. 7.

TABLE 3 f = 60

| i | r | d | ν | N (d) | N (h) | |
|---|---|---|---|---|---|---|
|  | 0.0000 |  | 1.000000 |  |  |  |
| 1 | 0.0000 | 44.0500 |  | 1.000000 |  | PL |
| 2 | 53.5046 | 4.0000 | 71.31 | 1.569070 | 1.582580 | L311 |
| 3 | −156.6479 | 9.0000 |  | 1.000000 |  |  |
| 4 | 125.7420 | 5.0000 | 82.56 | 1.497820 | 1.507940 | L321 |
| 5 | −24.9741 | 2.0000 | 39.68 | 1.654115 | 1.683310 | L322 |
| 6 | 51.0623 | 5.0000 |  | 1.000000 |  |  |
| 7 | 54.0857 | 6.0000 | 35.30 | 1.592700 | 1.623340 | L331 |
| 8 | −25.4046 | 1.5000 |  | 1.000000 |  |  |
| 9 | −23.0725 | 2.0000 | 44.27 | 1.613397 | 1.637555 | L332 |
| 10 | 45.3109 | 1.5000 |  | 1.000000 |  |  |
| 11 | 41.1037 | 6.0000 | 82.56 | 1.497820 | 1.507940 | L333 |
| 12 | −39.7647 | 37.5723 |  | 1.000000 |  |  |

(Values for Conditional Expressions)

(1): V31 = 51.7, V32 (=V34) = 39.4, V33 = 20.3
(2): V21 = 20.3, V22 = 44.6
(3): f/f2 = −0.89
(4): f/f3 = 1.11
(5): V21 − V22 = −24.3
(6): 31 − V32 = 12.3
(7): V33 − V32 = −19.1
(8): N31 − N32 = −0.02
(9): SD/f = 0.7

As described above, Example 3 satisfies all conditional expressions (1) through (9). Lateral chromatic aberration in h-line becomes a given amount and the other aberrations are excellently corrected.

Example 4

Figure 8:
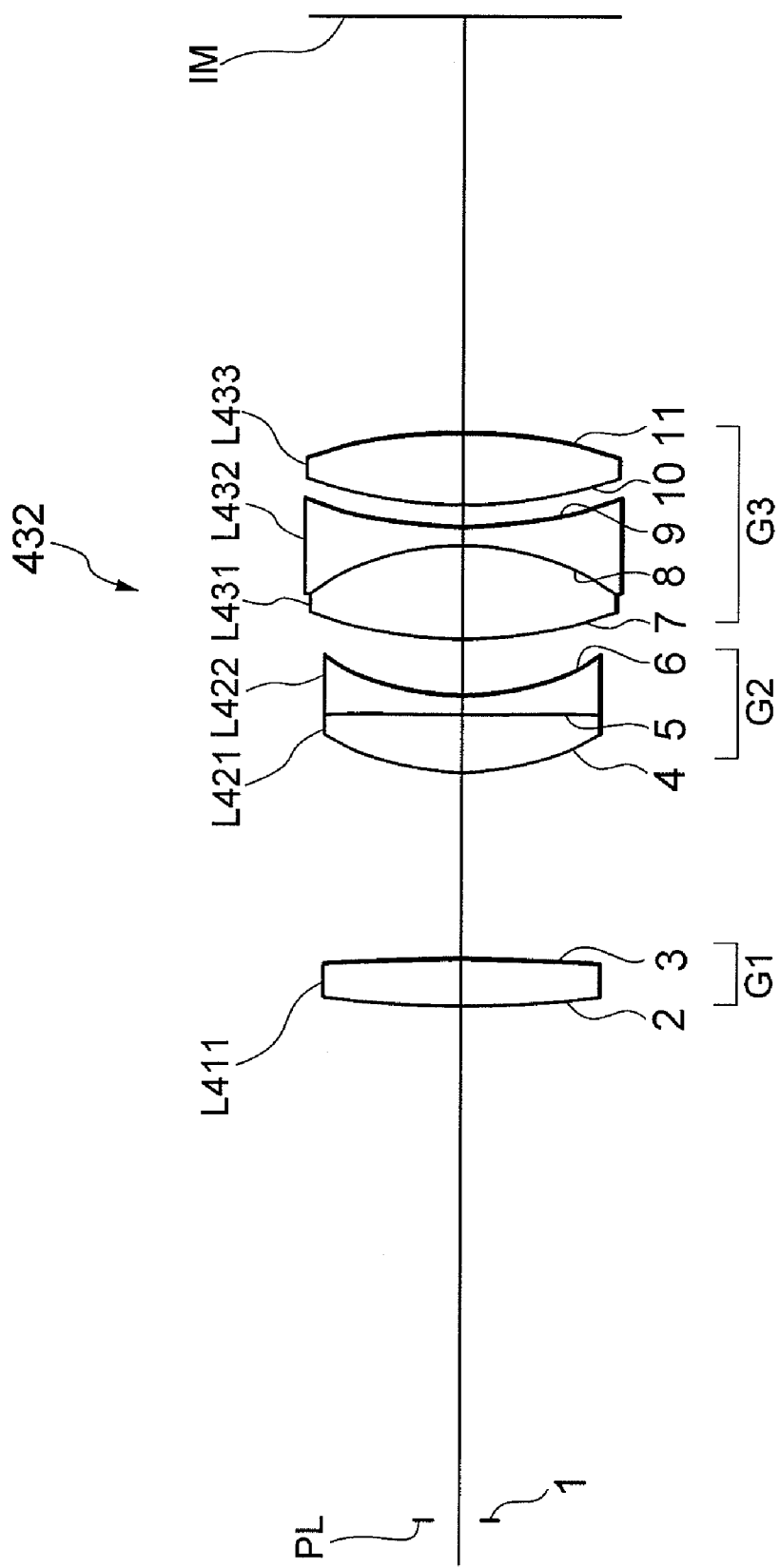
FIG. 8 is a diagram showing a lens configuration of a scanning optical system according to Example 4.

FIG. 8 is a diagram showing a lens configuration of a scanning optical system 432 according to Example 4 that is used in a confocal scanning microscope 1. The scanning optical system 432 according to Example 4 is composed of, in order from a pupil conjugate plane PL side, a first lens group G1 composed of a double convex positive lens L411, a second lens group G2 having negative refractive power composed of a cemented lens constructed by a positive meniscus lens L421 having a convex surface facing the object side cemented with a negative meniscus lens L422 having a convex surface facing the object side, and a third lens group G3 having positive refractive power composed of a cemented lens constructed by a double convex positive lens L431 cemented with a double concave negative lens L432 and a double convex positive lens L433 disposed with a given air space from the cemented lens. In Example 4, among two chromatic aberration correction portions provided in the third lens group G3, the chromatic aberration correction portion located to the scanning mechanism 31 side is constructed by a cemented lens, and the chromatic aberration correction portion located to the objective optical system side is constructed by two lenses with an air space in between. In this case also, a negative lens (a double concave negative lens L432) located at the center is commonly used in the two chromatic aberration correction portions. The above-described scanning mechanism 31 (such as a galvanometer mirror) is disposed in the vicinity of the pupil conjugate plane PL.

Figure 9:
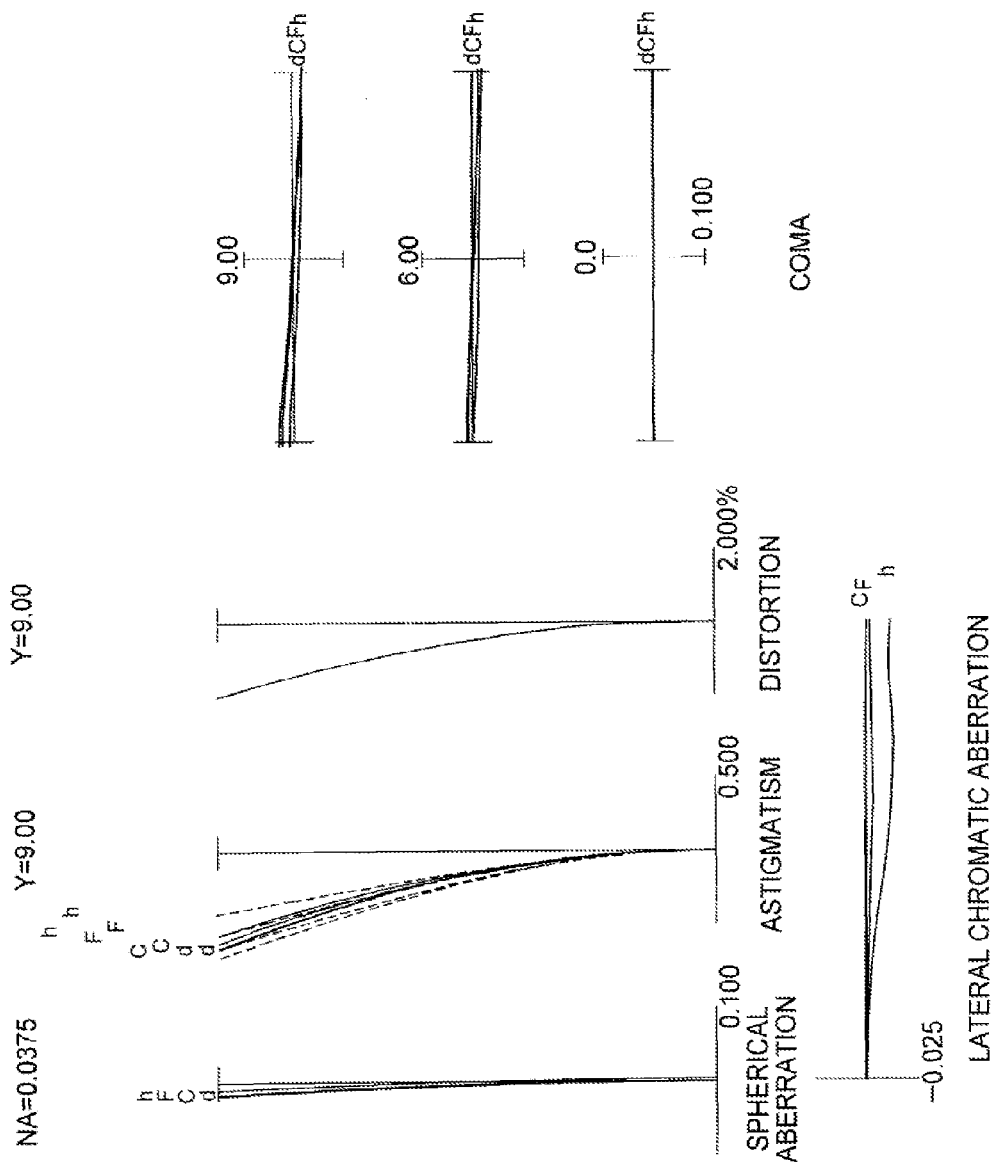
FIG. 9 shows various aberrations of the scanning optical system according to Example 4.

Various values associated with Example 4 are listed in Table 4. Various aberration curves of the scanning optical system 432 according to Example 4 are shown in FIG. 9.

TABLE 4 f = 60

| i | r | d | ν | N (d) | N (h) | |
|---|---|---|---|---|---|---|
|   |   | 0.0000 |   | 1.000000 |   |   |
| 1 | 0.0000 | 33.4000 |   | 1.000000 |   | PL |
| 2 | 105.2751 | 4.0000 | 71.31 | 1.569070 | 1.582580 | L411 |
| 3 | −203.7017 | 16.0000 |   | 1.000000 |   |   |
| 4 | 23.0910 | 5.0000 | 82.56 | 1.497820 | 1.507940 | L421 |
| 5 | 991.4499 | 1.5000 | 44.27 | 1.613397 | 1.637555 | L422 |
| 6 | 22.4488 | 5.0000 |   | 1.000000 |   |   |
| 7 | 38.2234 | 8.0000 | 95.02 | 1.434250 | 1.441870 | L431 |
| 8 | −23.3951 | 1.5000 | 44.27 | 1.613397 | 1.637555 | L432 |
| 9 | 39.5955 | 2.0000 |   | 1.000000 |   |   |
| 10 | 41.5815 | 6.0000 | 35.30 | 1.592700 | 1.623340 | L433 |
| 11 | −44.7624 | 35.1879 |   | 1.000000 |   |   |

(Values for Conditional Expressions)

(1A): V31 = 17.5, V32 (=V34) = 39.4, V33 = 51.7
(2): V21 = 20.3, V22 = 39.4
(3): f/f2 = −0.19
(4): f/f3 = 0.95
(5): V21 − V22 = −19.1
(6A): V31 − V32 = −21.9
(7A): V33 − V32 = 12.3
(8A): N33 − N34 = −0.02
(9): SD/f = 0.817

As shown in Example 4, conditional expressions (1A) through (5), (6A), (7A), (8A) and (9) are all satisfied, lateral chromatic aberration in h-line becomes a given amount, and the other aberrations are excellently corrected.

Example 5

Figure 10:
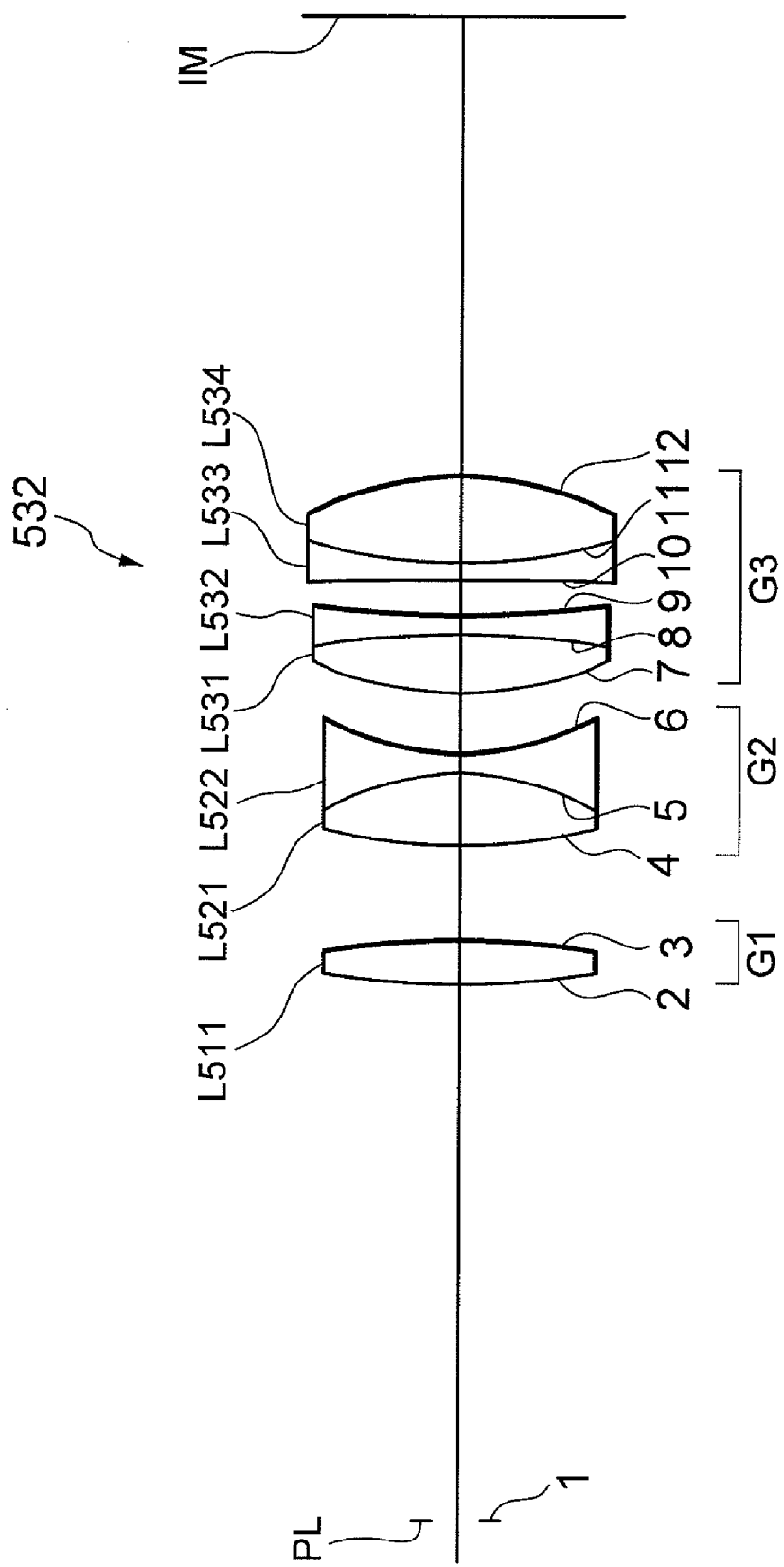
FIG. 10 is a diagram showing a lens configuration of a scanning optical system according to Example 5.

FIG. 10 is a diagram showing a lens configuration of a scanning optical system 532 according to Example 5 that is used in a confocal scanning microscope 1. The scanning optical system 532 according to Example 5 is composed of, in order from a pupil conjugate plane PL side, a first lens group G1 composed of a double convex positive lens L511, a second lens group G2 having negative refractive power composed of a cemented lens constructed by a double convex positive lens L521 cemented with a double concave negative lens L522, and a third lens group G3 having positive refractive power composed of a cemented lens constructed by a double convex positive lens L531 cemented with a double concave negative lens L532 and with an air space from the cemented lens, a cemented lens constructed by a double concave negative lens L533 cemented with a double convex positive lens L534. In Example 5, two chromatic aberration correction portions provided in the third lens group G3 are constructed by two cemented lenses located with an air space in between. The above-described scanning mechanism 31 (such as a galvanometer mirror) is disposed in the vicinity of the pupil conjugate plane PL.

Figure 11:
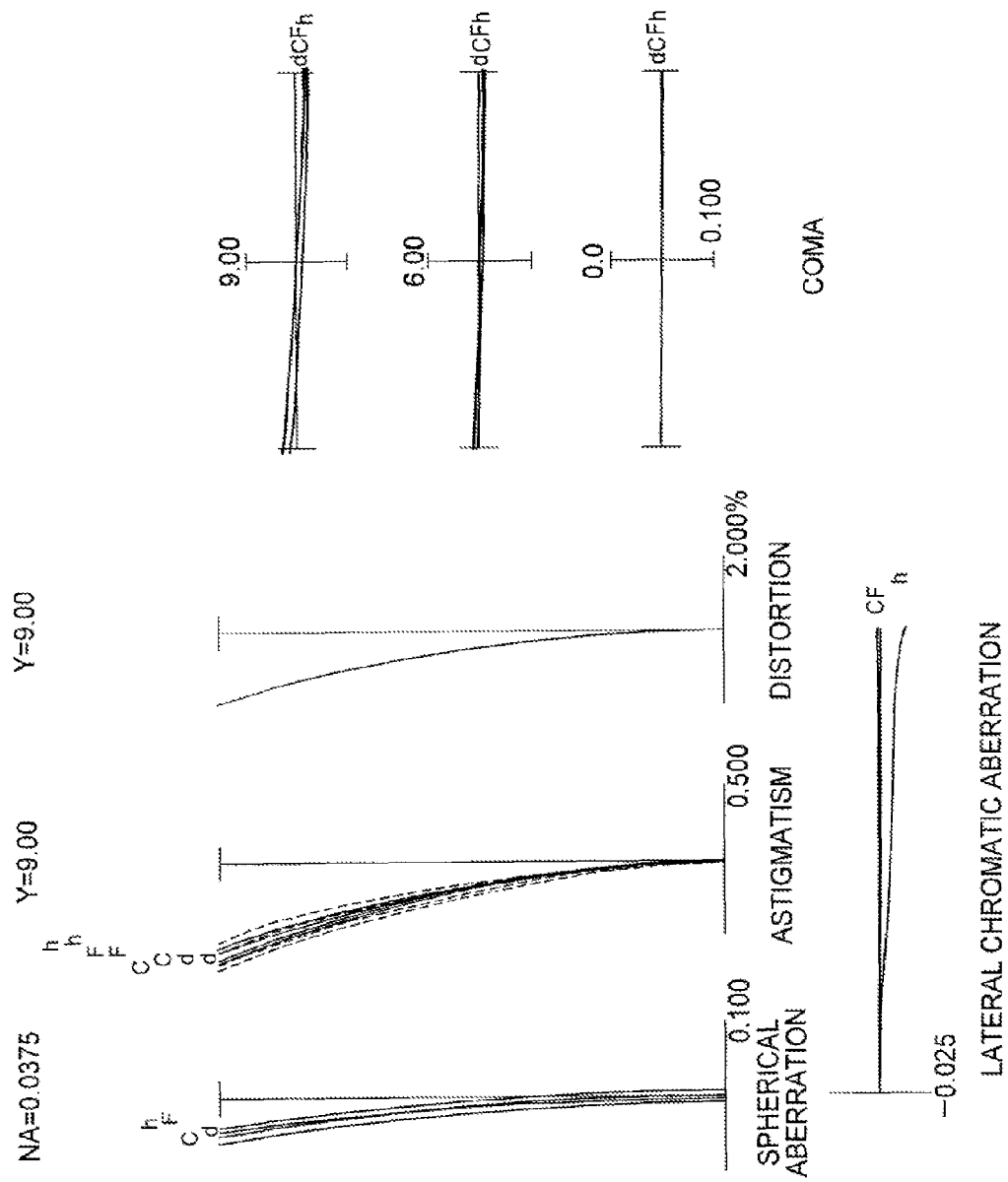
FIG. 11 shows various aberrations of the scanning optical system according to Example 5.

Various values associated with Example 5 are listed in Table 5. Various aberration curves of the scanning optical system 532 according to Example 5 are shown in FIG. 11.

TABLE 5 f = 60

| i | r | d | ν | N (d) | N (h) | |
|---|---|---|---|---|---|---|
|   |   | 0.0000 |   | 1.000000 |   |   |
| 1 | 0.0000 | 44.0500 |   | 1.000000 |   | PL |
| 2 | 74.7431 | 3.5000 | 71.31 | 1.569070 | 1.582580 | L511 |
| 3 | −72.3972 | 8.0000 |   | 1.000000 |   |   |
| 4 | 51.8926 | 6.0000 | 82.56 | 1.497820 | 1.507940 | L521 |
| 5 | −21.1296 | 1.5000 | 44.27 | 1.613397 | 1.637555 | L522 |
| 6 | 22.4626 | 5.0000 |   | 1.000000 |   |   |
| 7 | 28.8912 | 5.0000 | 35.30 | 1.592700 | 1.623340 | L531 |
| 8 | −80.0000 | 1.5000 | 44.27 | 1.613397 | 1.637555 | L532 |
| 9 | 100.0000 | 3.0000 |   | 1.000000 |   |   |
| 10 | −441.3645 | 1.5000 | 57.03 | 1.622800 | 1.641330 | L533 |
| 11 | 47.9590 | 7.0000 | 95.02 | 1.434250 | 1.441870 | L534 |
| 12 | −26.5887 | 37.4560 |   | 1.000000 |   |   |

(Values for Conditional Expressions)

(1): V31 = 51.7, V32 = 39.4, V33 = 17.5, V34 = 29.8
(2): V21 = 20.3, V22 = 39.4
(3): f/f2 = −1.31
(4): f/f3 = 1.40
(5): V21 − V22 = −19.1
(6): V31 − V32 = 12.3
(7): V33 − V34 = −12.3
(8): N31 − N32 = −0.02
(9): SD/f = 0.7

As shown in Example 5, conditional expressions (1) through (9) are all satisfied, lateral chromatic aberration in h-line becomes a given amount, and the other aberrations are excellently corrected.

Example 6

Figure 12:
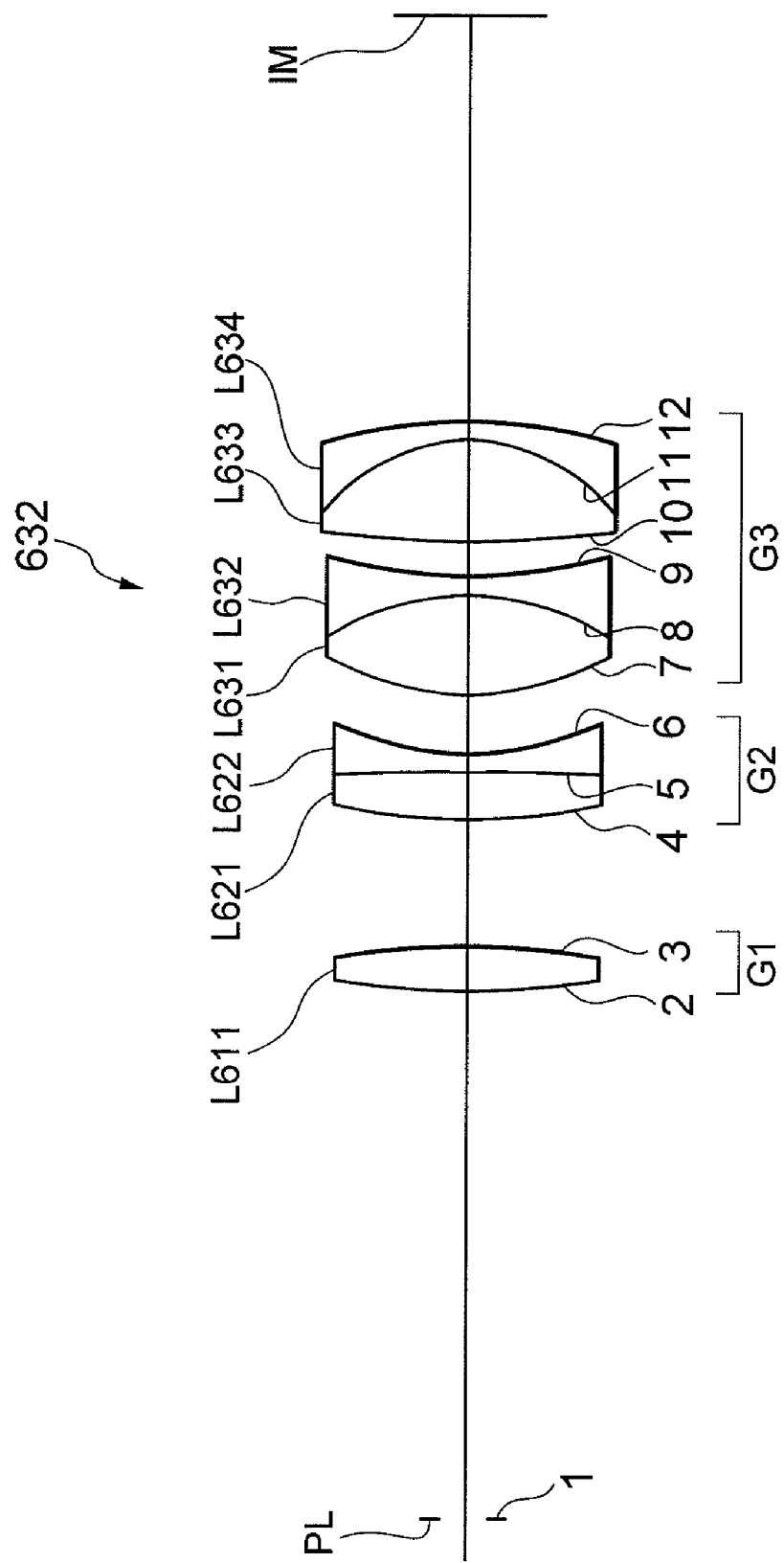
FIG. 12 is a diagram showing a lens configuration of a scanning optical system according to Example 6.

FIG. 12 is a diagram showing a lens configuration of a scanning optical system 632 according to Example 6 that is used in a confocal scanning microscope 1. The scanning optical system 632 according to Example 6 is composed of, in order from a pupil conjugate plane PL side, a first lens group G1 composed of a double convex positive lens L611, a second lens group G2 having negative refractive power composed of a cemented lens constructed by a double convex positive lens L621 cemented with a double concave negative lens L622, and a third lens group G3 having positive refractive power composed of a cemented lens constructed by a double convex positive lens L631 cemented with a double convex positive lens L632, and with a given air space from the cemented lens, a cemented lens constructed by a double convex positive lens L633 cemented with a negative meniscus lens L634 having a concave surface facing the pupil conjugate plane PL side. In Example 6 also, two chromatic aberration correction portions provided in the third lens group are constructed by two pairs of two-lens cemented lenses provided with an air space in between. The above-described scanning mechanism 31 (such as a galvanometer mirror) is disposed in the vicinity of the pupil conjugate plane PL.

Various values associated with Example 6 are listed in Table 6. Various aberration curves of the scanning optical system 632 according to Example 6 are shown in FIG. 13.

TABLE 6 f = 60

| i | r | d | ν | N (d) | N (h) | |
|---|---|---|---|---|---|---|
|   |   | 0.0000 |   | 1.000000 |   |   |
| 1 | 0.0000 | 33.4000 |   | 1.000000 |   | PL |

TABLE 6-continued

| 2  | 81.6286   | 3.5000  | 60.68 | 1.603110 | 1.619870 | L611 |
|----|-----------|---------|-------|----------|----------|------|
| 3  | −108.2436 | 11.0000 |       | 1.000000 |          |      |
| 4  | 50.0352   | 4.0000  | 82.56 | 1.497820 | 1.507940 | L621 |
| 5  | −603.8140 | 1.5000  | 44.27 | 1.613397 | 1.637555 | L622 |
| 6  | 25.3140   | 5.0000  |       | 1.000000 |          |      |
| 7  | 23.2075   | 8.5000  | 82.56 | 1.497820 | 1.507940 | L631 |
| 8  | −22.0748  | 1.5000  | 44.27 | 1.613397 | 1.637555 | L632 |
| 9  | 38.5948   | 3.0000  |       | 1.000000 |          |      |
| 10 | 101.3889  | 8.5000  | 38.02 | 1.603420 | 1.631960 | L633 |
| 11 | −15.6300  | 1.5000  | 44.27 | 1.613397 | 1.637555 | L634 |
| 12 | −42.5592  | 33.7281 |       | 1.000000 |          |      |

(Values for Conditional Expressions)

(1A): V31 = 20.3, V32 = 39.4, V33 = 47.3, V34 = 39.4
(2): V21 = 20.3, V22 = 39.4
(3): f/f2 = −0.82
(4): f/f3 = 1.16
(5): V21 − V22 = −19.1
(6A): V31 − V32 = −19.1
(7A): V33 − V32 = 7.9
(8A): N33 − N34 = −0.01
(9): SD/f = 0.8

As shown in Example 6, conditional expressions (1A), (2) through (5), (6A), (7A), (8A) and (9) are all satisfied, lateral chromatic aberration in h-line becomes a given amount, and the other aberrations are excellently corrected.

What is claimed is:

1. A confocal scanning microscope comprising:
an objective optical system that converges illumination light on a sample and forms a first image plane locating at a conjugate position with the sample;
a scanning mechanism that scans a surface of the sample so as to obtain a light intensity signal from the sample; and
a scanning optical system that is provided between the scanning mechanism and the first image plane formed by the objective optical system;
the scanning optical system being composed of, in order from the scanning mechanism side, a first lens group having positive refractive power, a second lens group having negative refractive power, and a third lens group having positive refractive power,
the third lens group having two chromatic aberration correction portions each formed by a positive lens and a negative lens or a negative lens and a positive lens adjoining each other, and
when Vh is defined by the following expression:

$Vh = 1000 \times \{(nh-nd)/(nd-1)\}$ where nd denotes a refractive index at d-line, and nh denotes a refractive index at h-line of an optical material constituting a lens,
the following conditional expression being satisfied:

$V31 > V32$ and $V33 < V34$ or $V31 < V32$ and $V33 > V34$ where V31 denotes Vh value of the positive lens constituting a chromatic aberration correction portion being disposed to the scanning mechanism side among two chromatic aberration correction portions in the third lens group, V32 denotes Vh value of the negative lens constituting the last mentioned chromatic aberration correction portion, V33 denotes Vh value of the positive lens constituting a chromatic aberration correction portion being disposed to the objective optical system side, and V34 denotes Vh value of the negative lens constituting the last mentioned chromatic aberration correction portion.

2. The confocal scanning microscope according to claim 1, wherein the second lens group has a chromatic aberration correction portion that is formed by a positive lens and a negative lens adjoining each other, and the following conditional expression is satisfied:

$V21 < V22$ where V21 denotes a Vh value of the positive lens forming the chromatic aberration correction portion, and V22 denotes a Vh value of the negative lens forming the last mentioned chromatic aberration correction portion.

3. The confocal scanning microscope according to claim 2, wherein the following conditional expressions are satisfied:

$-1.5 < f/f2 < 0$ $0.8 < f/f3 < 1.8$ where f2 denotes a focal length of the second lens group G2, f3 denotes a focal length of the third lens group G3, and f denotes a focal length of the scanning optical system, and
wherein, with respect to V31, V32, V33, V34, V21 and V22, when V31>V32 and V33<V34,
the following conditional expressions are satisfied:

$-30 < V21 - V22 < -15$ $+5 < V31 - V32 < +15$ $-30 < V33 - V34 < -10,$ and when V31<V32 and V33>V34,
the following conditional expressions are satisfied:

$-30 < V21 - V22 < -15$ $-30 < V31 - V32 < -10$ $+5 < V33 - V34 < +15.$

4. The confocal scanning microscope according to claim 3, wherein when V31>V32 and V33<V34, the following conditional expression is satisfied:

$-0.1 < N31 - N32 < +0.1,$ and when V31<V32 and V33>V34, the following conditional expression is satisfied:

$-0.1 < N33 - N34 < +0.1$ where N31 denotes a refractive index at d-line of the positive lens constituting the chromatic aberration correction portion being disposed to the scanning mechanism side among the two chromatic aberration correction portions in the third lens group, N32 denotes a refractive index at d-line of the negative lens constituting the last mentioned chromatic aberration correction portion, N33 denotes a refractive index at d-line of the positive lens constituting the chromatic aberration correction portion being disposed to the objective optical system side, and N34 denotes a refractive index at d-line of the negative lens constituting the last mentioned chromatic aberration correction portion.

5. The confocal scanning microscope according to claim 4, wherein the following conditional expression is satisfied:

$SD/f < 0.85$ where SD denotes a distance along an optical axis between the scanning mechanism side surface of the first lens group and the objective optical system side surface of the third lens group, and f denotes a focal length of the scanning optical system.

6. The confocal scanning microscope according to claim 3, wherein the following conditional expression is satisfied:

$SD/f < 0.85$ where SD denotes a distance along an optical axis between the scanning mechanism side surface of the first lens group and the objective optical system side surface of the third lens group, and f denotes a focal length of the scanning optical system.

7. The confocal scanning microscope according to claim 2, wherein when V31>V32 and V33<V34, the following conditional expression is satisfied:

$-0.1 < N31 - N32 < +0.1$, and when V31<V32 and V33>V34, the following conditional expression is satisfied:

$-0.1 < N33 - N34 < +0.1$ where N31 denotes a refractive index at d-line of the positive lens constituting the chromatic aberration correction portion being disposed to the scanning mechanism side among the two chromatic aberration correction portions in the third lens group, N32 denotes a refractive index at d-line of the negative lens constituting the last mentioned chromatic aberration correction portion, N33 denotes a refractive index at d-line of the positive lens constituting the chromatic aberration correction portion being disposed to the objective optical system side, and N34 denotes a refractive index at d-line of the negative lens constituting the last mentioned chromatic aberration correction portion.

8. The confocal scanning microscope according to claim 2, wherein the following conditional expression is satisfied:

$SD/f < 0.85$ where SD denotes a distance along an optical axis between the scanning mechanism side surface of the first lens group and the objective optical system side surface of the third lens group, and f denotes a focal length of the scanning optical system.

9. The confocal scanning microscope according to claim 1, wherein when V31>V32 and V33<V34, the following conditional expression is satisfied:

$-0.1 < N31 - N32 < +0.1$, and when V31<V32 and V33>V34, the following conditional expression is satisfied:

$-0.1 < N33 - N34 < +0.1$ where N31 denotes a refractive index at d-line of the positive lens constituting the chromatic aberration correction portion being disposed to the scanning mechanism side among the two chromatic aberration correction portions in the third lens group, N32 denotes a refractive index at d-line of the negative lens constituting the last mentioned chromatic aberration correction portion, N33 denotes a refractive index at d-line of the positive lens constituting the chromatic aberration correction portion being disposed to the objective optical system side, and N34 denotes a refractive index at d-line of the negative lens constituting the last mentioned chromatic aberration correction portion.

10. The confocal scanning microscope according to claim 1, wherein the following conditional expression is satisfied:

$SD/f < 0.85$ where SD denotes a distance along an optical axis between the scanning mechanism side surface of the first lens group and the objective optical system side surface of the third lens group, and f denotes a focal length of the scanning optical system.

* * * * *